Figure 1:
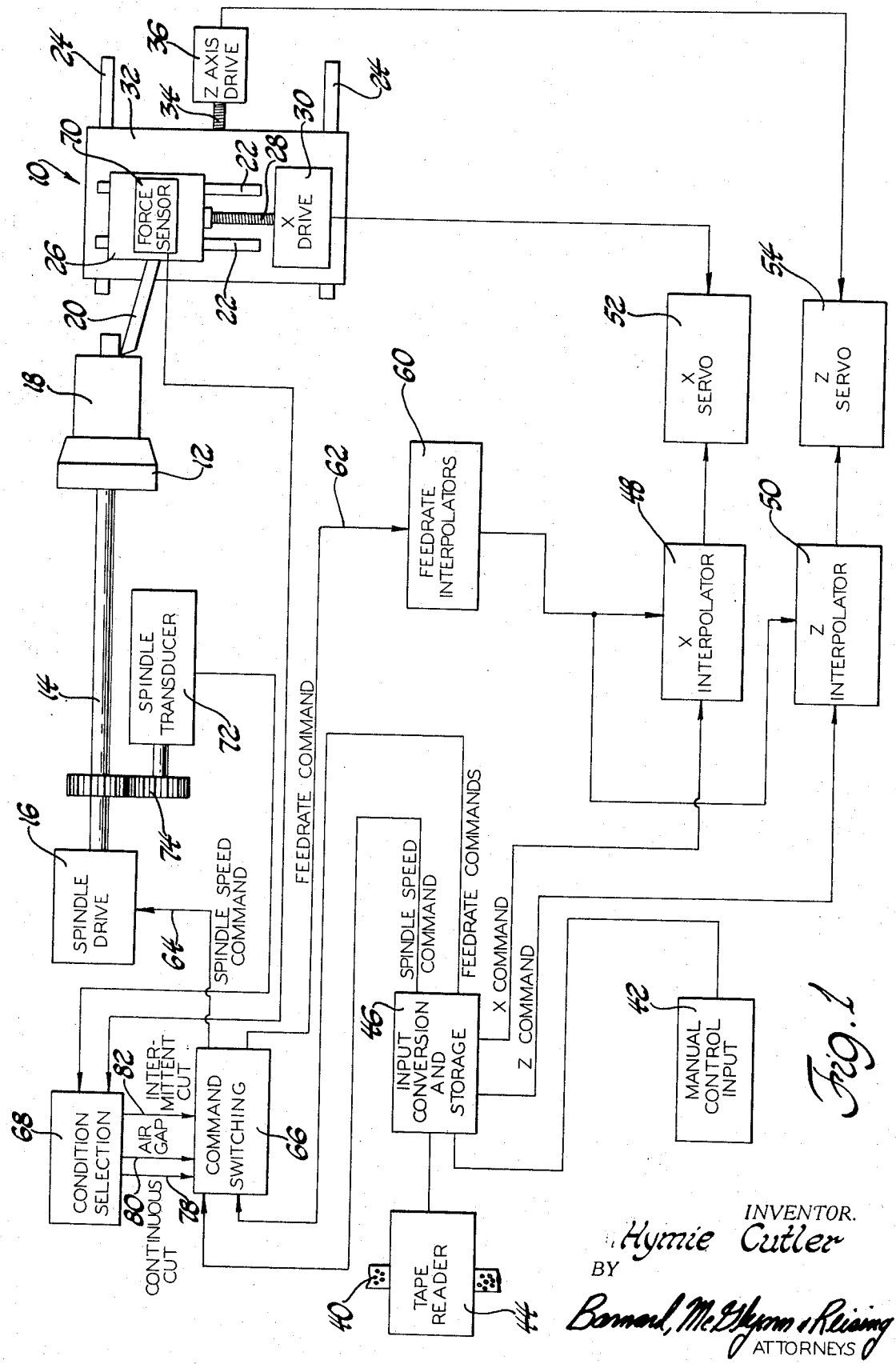

United States Patent

Cutler

[15] 3,698,268

[45] Oct. 17, 1972

[54] NUMERICAL CONTROL SYSTEM FOR INTERRUPTED CUTTING CONDITIONS

[72] Inventor: Hymie Cutler, Detroit, Mich.

[73] Assignee: The Bendix Corporation

[22] Filed: Aug. 7, 1970

[21] Appl. No.: 61,883

[52] U.S. Cl. ................ 82/2 B, 235/151.11, 318/571
[51] Int. Cl. .............................................. B23b 7/14
[58] Field of Search ............... 82/2 B, 1; 318/39, 571; 235/151.11

[56] References Cited

UNITED STATES PATENTS

| | | | |
|---|---|---|---|
| 3,548,172 | 12/1970 | Centner et al. | 82/2 B |
| 3,573,588 | 4/1971 | Geyer et al. | 318/571 |
| 3,596,544 | 8/1971 | Pitman | 82/1 |
| 3,278,817 | 10/1966 | Johnson et al. | 318/571 |

Primary Examiner—Leonidas Vlachos
Attorney—William F. Thornton, Barnard, McGlynn & Reising and Plante, Hartz, Smith and Thompson

[57] ABSTRACT

A numerical control system for a lathe includes a transducer which generates an electrical signal proportional to the force being exerted by the cutter. This signal is compared with a preset value which is equal to the minimum force exerted by the cutter when it was in contact with the workpiece to develop an output signal which consists of a pulse occuring each time the cutter is brought into contact or goes out of contact with the workpiece. This signal is used to clear a counter which receives a pulse for each small increment of rotation of the spindle. Based on the state of the counter and the outputs of the comparator, signals are derived indicating that the cutter is either out of contact with the workpiece, in contact with the workpiece, or performing an intermittent or interrupted cut such as occurs when the workpiece is out of round. These signals are used to provide one of three levels of signals to control the spindle speed and the rate of feed of the cutter relative to the spindle.

8 Claims, 3 Drawing Figures

NUMERICAL CONTROL SYSTEM FOR INTERRUPTED CUTTING CONDITIONS

BACKGROUND OF THE INVENTION

1. Field of the Invention

This invention relates to numerical control systems for machine tools and more particularly to a control system for a lathe which includes means for determining when the lathe is undergoing an intermittent cut and for providing preprogrammed control signals to the lathe at that time.

2. Prior Art

Numerical control systems for machine tools which control the path of motion of a machine cutter relative to the workpiece in accordance with input information have gained wide application in recent years since they allow the formation of complex shapes in an efficient manner with minimum operation intervention. The program for such a system specifies the path that the cutter is to follow in forming the workpiece and information which can be used to control the rate of cutter motion and the rate of spindle rotation. These programmed rates of operation are based on a number of assumptions relating to the machine operation, including the assumption that the raw workpiece configuration is such that the cutter is continuously in contact with the workpiece. In operation, the program may be used with workpieces which have such configuration that at certain times the cutter is out of contact with the workpiece. At such times, the cutter may be moved relative to the workpiece at substantially higher rates than would otherwise be allowable. Certain previous systems have provided means for an operator to override the programmed feedrate at such times so as to speed the completion of the programmed operation. In United States Patent Application Ser. No. 23,698, entitled ADAPTIVE NUMERICAL CONTROL SYSTEM FOR A MACHINE TOOL, filed by the present inventor and Thomas L. Glowczewski on Mar. 30, 1970, a system is described which senses the torque and vibration of the cutter during a machine operation to determine when the cutter is out of contact with the workpiece. At such times, termed the "air-gap" condition, the system switched the controlled feedrate value to a preset level which called for the maximum feedrate at which the cutter could impact the workpiece without creating damage to either the cutter or the surface finish of the workpiece.

This system does not work well when a turning operation is being performed and the cutter repeatedly goes into and out of contact with the workpiece because the rough stock being cut is out of round or the workpiece configuration includes ears, bosses, keyways, or the like which create intermittent contact. In such situations a control system having only the ability to distinguish between continuous contact and air-gap conditions will cause the feedrate to rapidly alternate between the two programmed values resulting in erratic operation of the controlled machine.

SUMMARY OF THE PRESENT INVENTION

In order to obviate this situation, the present invention contemplates a numerical control system including means for determining when the machine cutter is in an interrupted or intermittent cutting condition as well as in air-gap and continuous-cut conditions. When the machine is determined to be in this interrupted condition, preset or preprogrammed values of spindle speed and feedrate, which are suitable for such condition, and which differ from those applied during the air-gap condition, are imposed on the machine.

In order to sense the existence of the interrupted cut condition, a register is provided which receives and counts pulses generated for each small increment of spindle rotation by a transducer which is mechanically coupled to the spindle. The sensed cutting conditions are continuously scanned to determine when the cutter goes into or out of contact with the workpiece. Each time either of the conditions occur the counter is cleared. If the counter is cleared before it reaches a number which indicates that the spindle has undergone a full revolution since the last clearing, a signal is generated indicating that the machine is in interrupted cutting, and appropriate values of spindle speed and feedrate are applied to the system. If the cutter reaches a number indicating that at least one full spindle revolution has occurred since the last clearing and the sensed conditions indicate that the cutter is out of contact with the workpiece, then a signal is generated indicating that the system is in the air-gap condition. If the sensed condition indicates that the cutter is in contact with the workpiece and the count in the register indicates that at least one full spindle revolution has occurred, the system is in the continuous cutting condition and the appropriate programmed values of the control parameters are applied.

The programmed values of spindle speed and feedrate for the air-gap and interrupted-cut conditions may either be programmed on a tape or manually preset into the system. If programmed on the tape, generally only one set of values need be introduced for an entire program. The feedrate and spindle speed values for the continuous-cut condition may be programmed or may be calculated by an adaptive control system of the type disclosed in the above-mentioned patent application.

In the preferred embodiment of the invention the existence of contact between the tool and the workpiece is measured by a tool force sensor, but other appropriate arrangements such as conductive sensors and vibration sensors might be employed.

Figure 2:
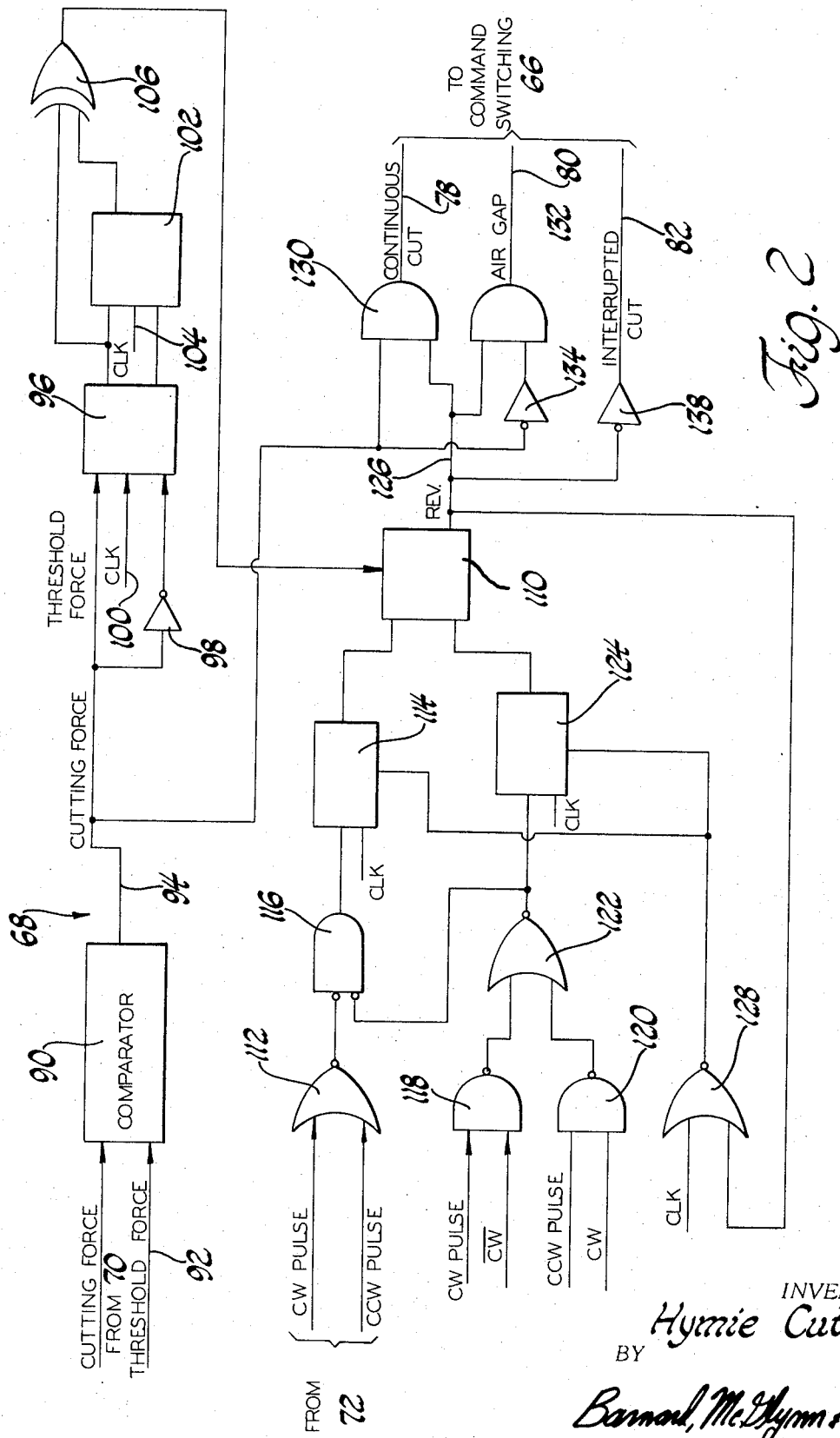
Figure 3:
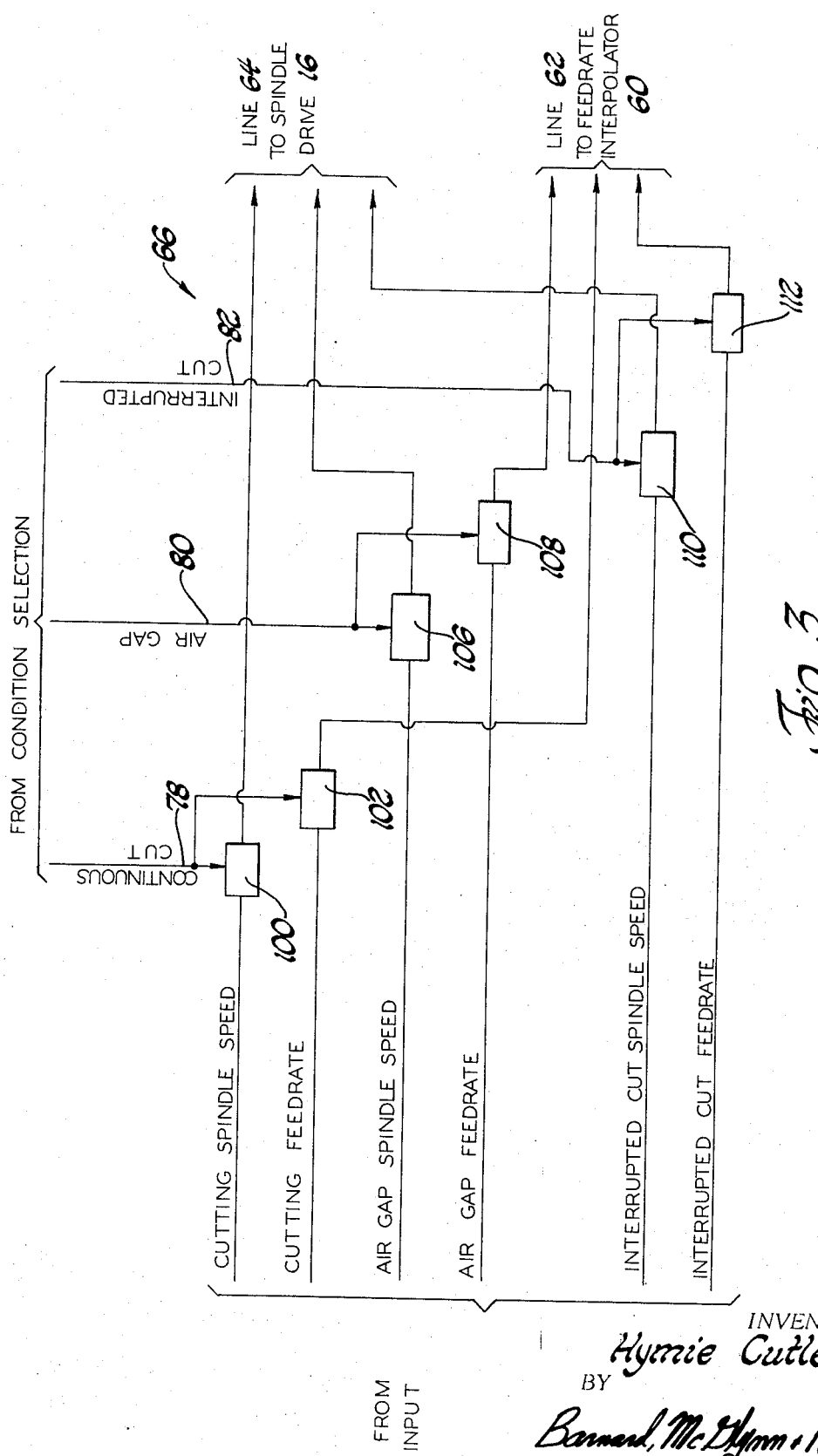

Other objects, advantages and applications of the present invention will be made apparent by the following detailed description of a preferred embodiment of the invention. The description makes reference to the accompanying drawings in which:

FIG. 1 is a partially schematic, partially block diagram of a numerical control system for a lathe incorporating the present invention;

FIG. 2 is a schematic diagram of the condition selection circuitry of the system of FIG. 1, which performs the function of determining the condition of the cutter relative to the workpiece on the basis of feedback information from the cutting operation; and FIG. 3 is a schematic diagram of the command switching logic employed in the embodiment of FIG. 1 which routes appropriate command signals to the spindle drive and the feedrate interpolator based on control signals from the condition selection unit.

The preferred embodiment of the present invention takes the form of a numerical control system for a lathe, generally indicated at 10, and while the present invention finds its most immediate application in connection with lathes, it is useful in connection with other forms of machine tools wherein the relationship between the cutter and the workpiece is such as to create situations wherein intermittent or interrupted contact occurs between the two.

The lathe 10 includes a work holder 12 adapted to be rotated by a spindle 14 through a variable speed spindle drive 16. A workpiece 18, supported in the work holder 12, is arranged to be operated on by a cutter 12 which is supported for motion along a first pair of ways 22, which are arranged normally to the axis of rotation of the spindle 14, hereinafter termed the "X axis," and a pair of ways 24 which are arranged parallel to the axis of rotation of the spindle, hereinafter termed the "Z axis." A carrier 26 which supports the tool 20 is driven along the ways 22 by a lead screw 28, rotatable by an X axis drive 30. The ways 22 are in turn supported on a carrier 32 driven along the ways 24 by a lead screw 34 which is in turn rotated by a Z axis drive 26.

The spindle drive 16, the X axis drive 30 and the Z axis drive 36 are powered by a control system which operates in accordance with numerical information introduced to the system from a punched tape 40 and a manual control input 42. Other forms of inputs such as magnetic tapes, punched cards or core memories might alternatively be used as information sources for the system. The punched tape 40 is preferably of the conventional eight-column type with the punches in each transverse line encoding one alpha-numeric symbol. A series of symbols disposed sequentially along the length of the tape constitutes a code word and a series of words are grouped together to form a block which generally contains the information necessary for the machine to accomplish one predetermined segment of motion. The code words contained in a single typical block might be as follows:

| Code | Function |
| --- | --- |
| g01 | Signifies that the following block relates to linear interpolation. |
| f327 | Feedrate number for continuous cutting. |
| s822 | Spindle speed number for continuous cutting. |
| x134 | X motion dimension. |
| z318 | Z motion dimension. |
| eb | End of block code divides data into blocks. |

This tape is prepared in the normal manner and constitutes a conventional numerical control tape. For the purposes of the present invention additional information must be fed to the system relating to the feedrates and spindle speeds for both "air-gap" and "interrupted-cutting" conditions. This information is normally constant for all or most of the blocks on a control tape and may either be entered into the system in the first information block from the tape 40 or may be dialed in on appropriate decimal switches contained in the manual control unit input 42.

Information contained on the control tape 40 is sequentially converted into electrical signals by a tape reader 44 and provided to an input conversion and storage unit 46, along with electrical signals representative of setting of switches on the manual control input 42. The input unit 46 decodes the signals and stores them so as to make them available to other units of the system.

At an appropriate point in the cycle the X motion dimension, or command number, is provided to an X interpolator 48 and the Z command number is provided to a Z interpolator 50. These interpolators act to generate trains of command pulses which occur at rates proportional to their input command numbers and which contain numbers of pulses proportional to these command numbers. The interpolators may be of the digital differential analyzer type disclosed in U.S. Pat. No. 3,128,374 to Ho et al.

The command pulse train output of the X interpolator 48 is provided to an X servo 52 which controls the motion of the X axis drive unit 30. Similarly, the command pulse output of the Z axis interpolator 50 is provided to a Z axis servo 54 which controls the motion of the Z axis drive unit 36. The servos 52 and 54 may be of the phase-analog variety disclosed in U.S. Pat. No. 3,011,110 and they function to move their associated drive units through one increment of motion for each pulse received. The X and Z commands include signs and the directions of rotation of the X and Z drive units 30 and 36 are controlled by their servos in the appropriate commanded directions. The X and Z drive units contain resolvers which feed back to their companion servos to provide a closed loop operation.

The rate of generation of pulse trains by the interpolators 48 and 50 is controlled by the pulse train output of a feedrate interpolator 60. Each pulse in the feedrate interpolator output train acts as an add-command for the X and Z interpolators. The interpolator 60 generates output pulses at a rate proportional to a feedrate command that is applied to it one line 62.

The spindle drive 16 rotates at a rate proportional to a spindle speed command number which is supplied to it on line 64. Both lines 62 and 64 come from a command switching unit 66 which receives the spindle speed commands and the feedrate commands for continuous-cutting, air-gap, and interrupted-cutting conditions from the input conversion and storage unit 46. One of these three spindle speed commands is provided as an output on line 64 to the spindle speed drive and one of the feedrate commands is provided as an output on line 62 to the feedrate interpolator 60. The choice among the three spindle speed and feedrate commands is made by a condition selection unit 68 on the basis of feedback information from the operation. The condition selection unit 68 receives the output of a force sensor 70, which is associated with a cutting tool 20, and provides an output signal proportional to the force exerted by the tool. The condition selection unit 68 also receives the pulse train output of a spindle transducer 72 which is connected to the spindle 14 by gearing 74. This transducer 72 provides an output pulse for each small increment of rotation of the spindle. The pulses occur on one of two lines, depending upon the direction of rotation of the spindle.

Broadly, the condition selection unit 68 determines whether the cutter 20 is in contact with the workpiece 18 based on the output signal from the force sensor. A greater force is, of course, exerted when the cutter is in contact than is exerted when the cutter is out of contact. The condition selection unit also uses the output pulses from the spindle transducer to determine whether the cutter has been in contact or out of contact with the workpiece for at least a full spindle revolution. If this is not the case, but the cutter goes in to and out of contact with the workpiece during a revolution, the selection unit interprets that the machine is in the intermittent-cut operation. A signal indicating that the machine is in the continuous-cut mode is provided to the command switching unit on line 78, the air-gap signal is provided on line 80 and the intermittent cut signal is provided on line 82.

The components of the system are conventional to numerical control systems with the exception of the condition selection unit 68 and the command switching unit 66. These circuits are therefore described in detail in connection with FIGS. 2 and 3 respectively.

Referring to FIG. 2, which discloses the circuitry of the condition selection unit 68, the analog voltage output of the force sensor 70 is provided to a commercially available solid state comparator unit 90 which is also supplied with a voltage on line 92, from the unit's internal power supply, which acts as a standard against which the sensor voltage is compared. The voltage on line 92 is chosen so that if the cutting force is equal to or greater than the standard, the cutter is in contact with the workpiece. This condition causes an output from the comparator on line 94 which is provided to the set input of a flip-flop 96 as well as to the reset input through an inverter 98. The flip-flop 96 is conditioned by a clock signal on line 100 and is therefore set in each clock period in which the cutter is in contact with the workpiece and is reset in other clock periods.

A second flip-flop 102 is also conditioned by a clock signal on line 104 and has its set and reset inputs respectively connected to the set and reset outputs of the flip-flop 96. Accordingly, the condition of the flip-flop 102 will be identical to the condition of the flip-flop 96 during the preceding clock period.

An exclusive OR gate 106 compares the set outputs of the flip-flops 96 and 102 and provides an output if they differ from one another. This condition occurs when the state of flip-flop 96 changes between two clock periods and thus signifies that the cutter has gone into contact with the workpiece or has gone out of contact with the workpiece during the last clock period.

The signal from the exclusive OR gate 106, indicating that the cutter-workpiece relationship has changed, is provided to the clear input of a bidirectional counter register 110. The function of the register 110 is to count the pulses produced by the spindle transducer 72 to determine whether the spindle has undergone one full revolution since the last time the register was cleared. If the register is cleared before the spindle has undergone one full revolution since the last clearing, the control recognizes either an air-gap or a continuous-cut condition depending upon whether the signal from the comparator 90 indicates that the cutter is out of or in contact with the workpiece.

The spindle transducer 72 and its associated logic may be of the type illustrated in U.S. Pat. No. 3,069,608 which provides output pulses on one line for each increment of clockwise rotation of the spindle, and outputs on another line for each increment of counterclockwise rotation.

Both of these lines are provided to a NOR gate 112 which sets a flip-flop 114 through a NOR gate 114.

Each time the flip-flop 114 is reset by a clock pulse, a pulse is provided to the up-counting input of the bidirectional counter register 110. A NAND gate 118 receives clockwise pulses as well as a signal from the input converting unit 46 indicating that the commanded spindle drive motion is in the counterclockwise direction. Similarly, a NAND gate 120 receives the counterclockwise pulses plus a signal indicating that the rotation should be in the clockwise direction. A NAND gate 122 provides either of these outputs to a flip-flop 124 which is operative to generate a down-counting pulse to the bidirectional counter 110 each time it is reset. These pulses which are sensed by the gates 118 and 120 represent vibration or jitter of the spindle and thus decrement the count. They are also provided to the NOR gate 116 in order to inhibit the application of pulses from the gate 112 to the counter.

When the count contained in the register 110 reaches a predetermined level which is representative of the number of counts generated by the transducer 72 during one full rotation of the spindle 14, an output is provided on line 126 which clears the flip-flops 114 and 124 through a NOR gate 128, stopping further input counts.

The output on line 126 is also provided to a pair of AND gates 130 and 132. The AND gate 130 is conditioned by the output signal on line 94 from the comparator 90, indicating that the cutting force exceeds the standard threshold force and therefore the cutter is in contact with the workpiece, while the AND gate 132 is conditioned by the inverse of this signal as generated by an inverter 134. The output of the AND gate 130, on line 178, is provided to the command switching circuit 66 and indicates that a continuous cut is in progress. The output of the AND gate 132 on line 80 indicates that an air-gap condition is in progress. The output of the counter on line 126 is passed through an inverter 138 to generate an output on line 82 indicating that an interrupted cut is in progress since the counter 110 did not reach a full revolution count before being cleared.

Within the command switching circuit 66, which is disclosed in detail in FIG. 3, the continuous cut signal on line 78 is provided to a pair of AND gates 100 and 102 which receive the cutting spindle speed and the cutting feedrate signals from the input conversion unit 46. When a signal is present on line 78, indicating that the system is in the continuous cut mode, these two signals from tape are provided to the spindle drive 16 and to the feedrate interpolator 60 respectively. In a similar manner, line 80 which carries a signal indicating whether the system is in an air-gap condition is provided to a pair of AND gates 106 and 108 which receive the air-gap spindle speed and the air-gap feedrate respectively, and line 82, which carries a signal when an interrupted cut is in progress, is provided to a pair of AND gates 110 and 112 which receive the values of interrupted-cut spindle speed and interrupted-cut feedrate. These gates provide outputs on line 64, or line 62 when properly conditioned.

As has been noted, the values of continuous-cut spindle speed and feedrate may be derived directly from the tape or may be derived by an adaptive system. The air-gap and interrupted-cut values of spindle speed and feedrate may also be encoded on the tape 40 or provided by the manual control input 42.

The system is thus seen to provide means for determining when the cutter is in contact with a workpiece, to determine the time duration of the contact in terms of rotation of the spindle, and to provide control signals to the machine which are dependent upon distinct determination.

Having thus described my invention, I claim:

1. In a numerical control system for a machine tool which includes a cutter operative to operate upon a workpiece, a source of numerical information relating to the desired motion of the cutter relative to the workpiece, said information including alternative information items; means for determining the length of time the cutter is in or out of contact with the workpiece and for providing an output which varies as a function of such time; and means for choosing items of numerical information from said source as a function of the output of said last means, and for using such information to control the motion of the cutter relative to the workpiece.

2. The system of claim 1 wherein the machine includes a rotatable spindle and the means for determining the time during which the cutter is in or out of contact with the workpiece comprises means for measuring the rotation that the spindle has undergone since the contact between the cutter and the workpiece changed.

3. In a numerical control system for a machine tool having a rotatable spindle and a cutter movable relative to said spindle, the improvement comprising: a source of numerical information relating to commanded motion of the cutter relative to the spindle; means for generating a first control signal having a first state when the cutter is in contact with the workpiece and a second state when the cutter is out of contact with the workpiece; means for measuring the rotation of the spindle which occurs between the change of states of said first control signals and for generating a second control signal; and means under control of said first and second control signals for selecting particular items from said information source and using them in the control of motion of the cutter relative to the workpiece.

4. The system of claim 3 wherein the information source includes a plurality of alternative control commands.

5. The system of claim 3 wherein the means for measuring the rotation of the spindle between changes of state of said first signal includes means for generating a pulse for each small increment of motion of the spindle and means for counting the pulses, the counting means being cleared upon change of state of said first signal.

6. The system of claim 5 wherein the information source includes a plurality of blocks of information each relating to one increment of motion of the cutter relative to the spindle and the information source provides alternative numerical values for at least certain parameters of control for each block.

7. The system of claim 6 wherein each block contains information relating to the path of one segment of motion of the cutter relative to the workpiece and the information source provides alternate numerical values for the rate of motion of the cutter relative to the spindle for each increment of motion.

8. In a numerical control system for a machine tool having a rotatable spindle, a cutter positionable relative to the spindle, a drive system for the cutter including an interpolator, and a variable speed-drive system for the spindle, the improvement comprising: an information source providing a plurality of blocks of numerical information each defining a path segment for the motion of the cutter relative to the spindle, the information source also providing numerical items relating to alternate rates of motion of the cutter relative to the workpiece for each motion segment; means for generating a control signal which has a first state when the cutter is in contact with the workpiece and a second state when the cutter is out of contact with the workpiece; means for determining the extent of rotation of the spindle between changes of state of said first control signal, and for generating a second control signal; and means for receiving said first and second control signals and for selecting among the items of numerical information relating to alternate rates of motion of the cutter relative to the workpiece based upon said first and second control signals and for using an item of numerical information so selected to control the rate of motion of the cutter relative to the workpiece.

* * * * *